United States Patent
Sargeant et al.

(10) Patent No.: US 6,511,740 B2
(45) Date of Patent: Jan. 28, 2003

(54) INLINE COATED POLYESTER FILM WITH THERMALLY STABLE AND RELEASABLE COATING

(75) Inventors: Steven J. Sargeant, East Greenwich, RI (US); Yasushi Takada, Shiga (JP); Masaaki Sudo, Gifu (JP); John Fitch, Warwick, RI (US)

(73) Assignee: Toray Plastics (America), Inc., RI (US)

( * ) Notice: Subject to any disclaimer, the term of this patent is extended or adjusted under 35 U.S.C. 154(b) by 0 days.

(21) Appl. No.: 09/730,951

(22) Filed: Dec. 6, 2000

(65) Prior Publication Data

US 2002/0106505 A1 Aug. 8, 2002

(51) Int. Cl.[7] .......................... B32B 27/30; B32B 27/36
(52) U.S. Cl. ...................... 428/336; 428/480; 428/483; 428/910; 526/319; 526/326
(58) Field of Search ................................. 428/336, 480, 428/483, 960; 526/319, 326

(56) References Cited

U.S. PATENT DOCUMENTS

| 4,603,079 A | * | 7/1986 | Nishizaki et al. ........... 428/323 |
| 4,743,643 A | * | 5/1988 | Buter .......................... 524/396 |
| 4,857,574 A | * | 8/1989 | Buter .......................... 524/396 |
| 5,624,076 A | * | 4/1997 | Miekka et al. ................. 164/46 |
| 5,795,649 A | * | 8/1998 | Cosentino et al. ....... 427/383.1 |
| 5,928,781 A | * | 7/1999 | Caines et al. ............ 427/393.5 |
| 5,968,664 A | * | 10/1999 | Heberger et al. ............ 264/1.1 |

* cited by examiner

*Primary Examiner*—Vivian Chen
(74) *Attorney, Agent, or Firm*—Schnader Harrison Segal & Lewis LLP

(57) ABSTRACT

A biaxially oriented polyester film with a substantially non-crosslinked polymeric coating consisting essentially of a styrene/acrylate copolymer emulsion, wherein the coating is highly thermally stable with a primary onset temperature of greater than about 350° C., having a glass transition temperature between about 0° C. and about 50° C., having a rapid solubility in a low molecular weight organic solvent, and having a surface energy of greater than about 35 dyne/cm and less than about 40 dyne/cm.

6 Claims, No Drawings

INLINE COATED POLYESTER FILM WITH THERMALLY STABLE AND RELEASABLE COATING

BACKGROUND OF THE INVENTION

It is desired to provide a coated polyester film for the production of optically variable pigments. The coating for use in this process is preferred to be processed inline to provide for the lowest cost of production. Furthermore, this coating is defined to have the following unique and special attributes:

1) High thermal stability,
2) Very rapid dissolution into a recovery solvent like acetone,
3) Water insolubility,
4) Tg>0 C, Tg<50 C as defined by the differential scanning calorimetery (DSC) method,
5) Highly extensible to survive an inline coating process, without turning hazy or white.
6) Substantially noncrosslinked,
7) Surface Energy <40 dyne/cm and >=35 dyne/cm.

Surprisingly, we have found that materials with these special attributes have excellent metallizing and recovery properties, making them amenable to the production of optically variable pigments.

DESCRIPTION OF LOCATED PRIOR ART

U.S. Pat. No. 5,968,664 discloses a polyester film with a releasable coating comprising the following:

i) Copolymers of MethylMethacrylate (MMA) and EthylAcrylate (EA)
ii) Homopolymers of Polyacrylic Acid (AA)
iii) Said coating layers being soluble in the release solvent.

Our invention described herein is distinctly different than those mentioned in the '664 patent in that:

a) The specific coating formulations required herein are different.
b) The limitations of thermal stability, quantification of acetone solubility, metal release, surface energy and glass transition temperatures are not disclosed in the reference.

U.S. Pat. No. 5,795,649 discloses a polymeric coated film with the following attributes:

i) Water soluble copolymer of styrene (S) and an alpha, beta-unsaturated carboxylic acid or anhydride like maleic anhydride,
ii) Molecular weight of said copolymer from about 700 to 10,000, Our invention described herein is distinctly different than those mentioned in the '649 patent in that:

a) The specific coating formulations required are different. Additionally, the molecular weight restriction of the referenced patent is considered to limit the actual processability of the materials.
b) The limitations of thermal stability, quantification of acetone solubility, metal release, surface energy and glass transition temperatures are not disclosed in the reference.

U.S. Pat. No. 5,928,781 discloses a method of making a thin layer or flakes of materials by using a coated substrate. The coating is further defined as:

i) Solvent soluble,
ii) Containing a Crotonic acid polymer.

The invention described herein is distinctly different than those mentioned in the '781 patent in that:

a) The specific coating formulations required herein are different.
b) The important limitations of thermal stability, quantification of acetone solubility, metal release, surface energy and glass transition temperatures are not disclosed in the reference.

U.S. Pat. No. 6,013,370 discloses the method for making optically variable pigments by use of a sputtering process. The mode of cracking of the flake is indicated as being a key to the process.

The '370 patent is a process patent. It discloses that the mode of cracking of the flake is a key to the usefulness of the flake itself. It discloses that the coating disclosed assists in producing flake of high aspect ratio, and mentions it as desirable.

DESCRIPTION OF THE INVENTION

Thermal stability in accordance with this invention is defined herein as the temperature at which a 10% weight loss occurs of the primary decomposition curve for the polymeric coating materials. In determining thermal stability, the coating material is heated in a nitrogen atmosphere from ambient to 105° C. at 10° C./min. The sample is then held at 105° C. for 15 minutes then ramped to 550° C. at 10° C. per minute. The temperature corresponding to 10% weight loss is read from the weight loss curve.

Acetone solubility has been measured by immersing the coated film into a bath of acetone for approximately 2 seconds. The films were then removed and allowed to air dry. The films were then inspected with a light microscope at 40× magnification. A rating of 5 means the coating was completely removed in the 2 second immersion in the acetone solution. A rating of 0 means that no coating was seen to have been removed via light microscopy inspection. A rating of 1 means that less than about 25% of the coating was removed via exposure in acetone. A rating of 2 means that less than about 50% of the coating was removed via exposure to acetone. A rating of 3 means that less than about 75% of the coating was removed by acetone. A rating of 4 means that less than about 100% was removed by acetone, or that a trace of the coating layer remained in the area immersed in acetone.

Surface energy is defined from measurements of the contact angle of water on the surface of the coated PET base film. The surface energy numbers reported here are derived from conversion of the contact angle of water on the surface to absolute wetting tension values.

Glass transition temperatures (Tg) are reported from manufacturers literature. They are obtained by making measurements by use of the well-known DSC method. Glass transition temperatures were measured by the manufacturers of the polymer emulsions via the use of differential scanning calorimetery (DSC). DSC is a well-known method in the art to characterize thermal phase transitions of polymeric materials; please see Allcock, H. R., Camp, J. W. "Contemporary Polymer Chemistry", Prentice-Hall 1990, Chapter 17, which describes DSC as the Industry Standard technique for measuring Tg values.

Metal release is measured from bell jar metallizing the coated PET or related polymeric samples with aluminum metal to an OD of about 2.5. The metallized samples are then submersed in acetone for approximately 2 seconds, removed, and then brushed gently with a dry cloth. A metal release value of Excellent means that essentially all aluminum was released when using this technique. A metal release rating of fair means that approximately 25–50% of the metal was released via this technique. A metal release value of poor means that less than approximately 25% was released by this technique.

DESCRIPTION

Although not wishing to be bound by any particular theory, we believe the following description of the physical process employed is helpful in illustrating the invention.

In the vacuum sputtering process of polyester film (PET), an organic surface (the PET film) is in contact with a hot metal gas (the sputerant). The temperature of this gas may approach 1000° C. When the hot metal gas contacts the organic coating, decomposition of the underlying substrate can often occur. This decomposition may result in crosslinking of the coating, shrinkage of the coating or off gassing of decomposed adducts. Crosslinking of the coating will render it insoluble and thus unable to release the inorganic pigment. Thermal shrinkage or off gassing of decomposition adducts will degrade the metal layer through increased cracking and pitting of the metal layer. Therefore, it is desired to construct a coating surface having high thermal stability to resist the effects of high thermal loads from the sputtering process.

Concurrently, metal having a high surface energy has stronger adhesion to surfaces having high surface energy. An increase in metal/coating adhesion forces increases the time required to release the sputter coated metal from the surface of the coated PET. Therefore, we have found that for best processing of the metalized films, that a surface energy SE between about 35 dyne/cm and about 40 dyne/cm is preferred.

EXAMPLES

Example 1

A coating solution of Akzo Nobel Resins(1) 33-3372, a high molecular weight copolymer of Styrene and methyl methacrylate was prepared as follows:

| Resin | 12 parts |
| --- | --- |
| Distilled Water | 100 parts |
| Fluorosurfactant (2) (1% Solution) | 0.25 parts |

(1) Akzo Nobel, 2904 Missouri Avenue, E. St. Louis, IL 62205
(2) Zoynl FSO, Dupont Chemicals, Wilmington, DE 19880.

The Akzo 33-3372 material (Example 1) has recently been described as a possible range of:

| Styrene | 5–60% |
| --- | --- |
| MMA | 1–25% |
| Butylmethylacrylate | 20–70% |
| 2-ethyl-hexylacrylate | 1–25% |
| Acrylic Acid | 1–10% |
| Methacrylic Acid | 1–10% |

The base film was prepared from dried PET pellets with 0.015% by weight of 0.4 um silica and 0.005% by weight of 1.4 um silica as fillers. This material was extruded onto a casting drum maintained at 25° C., and pinned down to the drum via electrostatic force. The base film was oriented in the machine direction (MD direction) at a 3.3 draw ratio. The coating was applied with a #6 meyer rod. The film was then heated and stretched in the transverse direction (TD direction) at a 3.3 draw ratio. Within the TD direction stretcher, referred to as a stenter, the coated film was exposed to 3 separate heating zones at 85° C., 100° C. and 225° C. respectively. The resultant clear films were wound for flirther evaluation.

Example 2

A coating solution of Lucidene 243(3), a high molecular weight copolymer of Styrene, α-methyl styrene and methylmethacrylate and $NH_4$-acrylic acid was prepared as

| Resin | 10 parts |
| --- | --- |
| Distilled Water | 100 parts |
| Fluorosurfactant (1% Solution) | 0.25 parts |

(3) Rohm and Haas, 100 N. Riverside Plaza, Chicago, IL 60606.

The base film was prepared from dried PET pellets with 0.015% by weight of 0.4 um silica and 0.005% by weight of 1.4 um silica as fillers. This material was extruded onto a casting drum maintained at 25° C., pinned down to the drum via electrostatic force. The base film was oriented in the MD direction at a 3.3 draw ratio. The coating was applied with a #6 Meyer rod. The film was then heated and stretched in the TD direction at a 3.3 draw ratio. Within the TD direction stretcher, referred to as a stenter, the coated film was exposed to 3 separate heating zones at 85° C., 100° C. and 225° C. respectively. The resultant clear films were wound for further evaluation.

Example 3

A coating solution of Nacrylic 68-2500(4), a high molecular weight copolymer of Styrene and methylmethacrylate, was prepared as follows:

| Resin | 10 parts |
| --- | --- |
| Distilled Water | 100 parts |
| Fluorosurfactant (1% Solution) | 0.25 parts |

(4) Nacan Chemicals, Montreal, Canada.

Comparative Example 1

A coating solution of Hycar 26315 (5), a high molecular weight copolymer of styrene, ethylacrylate, acrylonitrile and methoylacrylamide was prepared as follows:

| Resin | 10 parts |
| --- | --- |
| Distilled Water | 100 parts |
| Fluorosurfactant (1% Solution) | 0.25 parts |

(5) B.F. Goodrich Corporation, 9911 Brecksville Rd., Cleveland OH 44141.

The base film was prepared from dried PET pellets with 0.015% by weight of 0.4 um silica and 0.005% by weight of 1.4 um silica as fillers. This material was extruded onto a casting drum maintained at 25° C., pinned down to the drum via electrostatic force. The base film was oriented in the MD direction at a 3.3 draw ratio. The coating was applied with a #6 Meyer rod. The film was then heated and stretched in the TD direction at a 3.3 draw ratio. Within the TD direction stretcher, referred to as a stenter, the coated film was exposed to 3 separate heating zones at 85° C., 100° C. and 225° C. respectively. The resultant clear films were wound for further evaluation.

Comparative Example 2

A coating solution of Rhoplex HA-16 (6), a high molecular weight copolymer of Styrene, Acrylic Acid and Methylmethacrylate.

| | |
|---|---|
| Resin | 10 parts |
| Distilled Water | 100 parts |
| Fluorosurfactant (1% Solution) | 0.25 parts |

(6) Rohm & Haas 1500 Lathem St., Batavia IL 60510.

The base film was prepared from dried PET pellets with 0.015% by weight of 0.4 um silica and 0.005% by weight of 1.4 um silica as fillers. This material was extruded onto a casting drum maintained at 25° C., pinned down to the drum via electrostatic force. The base film was oriented in the MD direction at a 3.3 draw ratio. The coating was applied with a #6 Meyer rod. The film was then heated and stretched in the TD direction at a 3.3 draw ratio. Within the TD direction stretcher, referred to as a stenter, the coated film was exposed to 3 separate heating zones at 85° C., 100° C. and 225° C. respectively. The resultant clear films were wound for further evaluation.

Although the Examples indicate the coatings were applied by a Meyer rod, any well-known and effective doctoring method known in the art, and any suitable coating method may be used in the application of the coating materials. Examples of other suitable coating methods include gravure coating, reverse roll coating, extrusion die coating, knife over roll coating, kiss coating with air knife doctoring, and others.

In the Examples specific information about the base film is given. However, we consider that many modifications to the base film are possible without changing the beneficial properties of the coated film in a significant way. Examples well known in the art to change the base film properties include changing the type, size and content of its filler materials. Filler materials are required in the production of clear sheet plastics in order to prevent blocking of the film. Therefore, many changes are possible in the content of the fillers without affecting the properties of the coated film in a material way. Additionally, besides PET film, the release properties of the coating described in this invention disclosure can be achieved by the use of PBT film (polybutyleneterephthlate) and PEN film (polyethylene-2,6-naphthylate) instead of PET, and other copolyester films having an intrinsic viscosity of about 0.65 more or less.

Regarding extensibility in accordance with this invention, we have indicated methods used to determine metal release and acetone solubility. Extensibility of the coating is difficult to define exactly. However, if the coating utilized is not extensible then it will not survive the stretching process used to produce bi-axially oriented PET. We know the coatings are not extensible when they turn hazy or white when they are coated, dried and then stretched in the film making process. For the materials used in the examples and comparative examples all survived the stretching process. However, it is not uncommon for materials to fail this process.

Regarding solvents, acetone is an important solvent; methylethylketone (MEK) and toluene are also useful in accordance with this invention.

Regarding freedom from crosslinking we believe it is preferable to minimize the degree of crosslinking of the coating to less than about 1% by weight, based upon the total weight of the polymer.

Various coating may be used, including water insoluble emulsions, styrene/methylmethacrylate copolymer or various terpolymers; other monomers may be present in the emulsion.

TABLE I

Summary of thermal stability, acetone solubility, surface energy (SE) and metal release for materials described here.

| Material | Tg C | SE of Film Dyne/cm | Onset C | Acetone Solubility | Metal Release |
|---|---|---|---|---|---|
| Example 1 | 44 | 35 | 380 | 5 | Excellent |
| Example 2 | 7 | 38 | 360 | 4 | Excellent |
| Example 3 | 25 | 39 | 380 | 5 | Good |
| Comparative Example 1 | 55 | 37 | 390 | 1 | Fair |
| Comparative Example 2 | 55 | 43 | 380 | 0 | Poor |

What is claimed is:

1. A biaxially oriented polyester film having a polymeric coating consisting essentially of a styrene/acrylate copolymer emulsion, wherein:

said coating is highly thermally stable with a primary onset temperature of greater than about 350° C., has a glass transition temperature between about 0° C. and about 50° C., and has a surface energy of greater than about 35 dyne/cm and less than about 40 dyne/cm, and wherein upon immersion into a bath of acetone for approximately 2 seconds the coating is either completely removed or only a trace remains, and wherein said polymeric coating comprises less than about 1% by weight of crosslinked polymer.

2. The film defined in claim 1 wherein said polyester film is polyethylene terephthalate.

3. The film defined in claim 1 wherein said polyester film is polybutylene terephthalate.

4. The film defined in claim 1 wherein said polyester film is polyethylene-2,6-naphthalate.

5. The film defined in claim 1 wherein said styrene/acrylate copolymer has a thickness of about 0.08 μm.

6. A biaxially oriented polyester film having a non-crosslinked polymeric coating consisting essentially of a styrene/acrylate copolymer emulsion, wherein:

said coating is highly thermally stable with a primary onset temperature of greater than about 350° C., has a glass transition temperature between about 0° C. and about 50° C., and has a surface energy of greater than about 35 dyne/cm and less than about 40 dyne/cm, and wherein upon immersion into a bath of acetone for approximately 2 seconds the coating is either completely removed or only a trace remains.

* * * * *